Feb. 16, 1937.    J. J. CANTOR    2,070,561
LAMP SUPPORTING AND CORD EXTENSION REEL
Filed Oct. 8, 1934
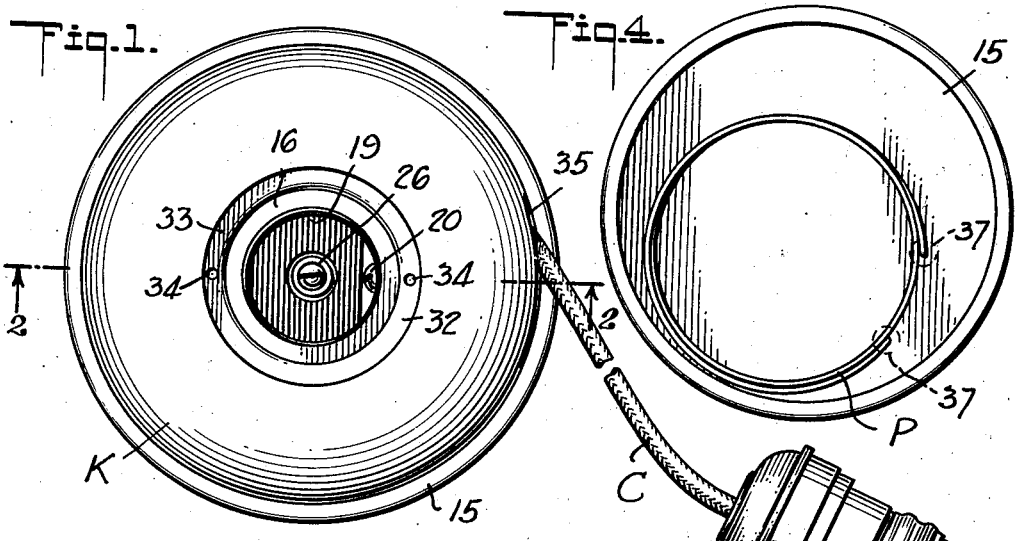
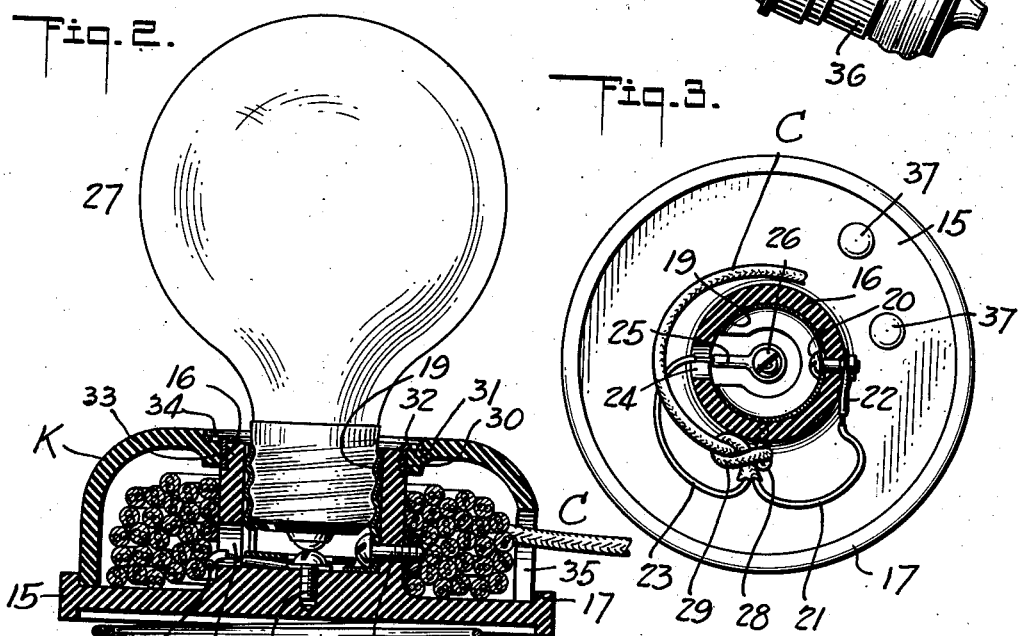
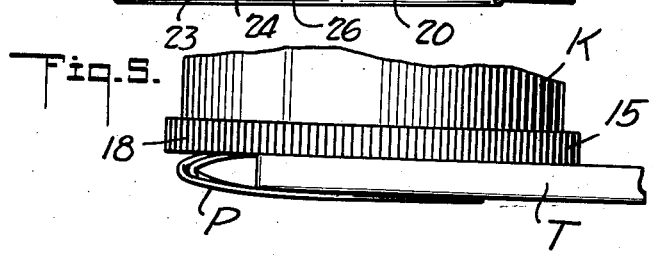
INVENTOR.
JACOB J. CANTOR
BY
Edwin D. Jones,
ATTORNEY Patented Feb. 16, 1937

2,070,561

UNITED STATES PATENT OFFICE 2,070,561

LAMP SUPPORTING AND CORD EXTENSION REEL

Jacob J. Cantor, Los Angeles, Calif.

Application October 8, 1934, Serial No. 747,277

1 Claim. (Cl. 173—367)

My invention relates to that class of portable reels designed to support an electric lamp and on which is wound a plug-carrying conducting cord to be extended to any desired length for connection to a wall or other form of socket, and in this manner to permit illumination of the lamp irrespective of the remoteness of the reel from the wall socket.

Such reels, as heretofore proposed, are complicated structurally and therefore relatively expensive to manufacture, but the most outstanding disadvantage of such reels is that the reel proper and the casing or housing therefor are so related one to the other that when turning the reel to wind or unwind the conducting cord, the cord scrapes or rubs against the inner walls of the casing to set up considerable resistance to manual turning of the reel, and also to rapidly wear away the fabric covering and insulation on the cord, resulting first in an unraveled cord and finally in short circuits.

It is a purpose of my invention to provide a reel of the class described which is structurally characterized by its simplicity and low cost of manufacture, and functionally by so correlating the reel proper and the casing that the conducting cord is out of rubbing contact with the casing so that during turning movement of the reel no appreciable wear of the conducting cord occurs, and the reel can be more easily turned.

It is also a purpose of my invention to provide a lamp supporting and conducting cord reel in combination with a clasp so correlated with the reel as to detachably secure it to a support in the manner to fix the reel against rotation, and to thereby prevent accidental unwinding of the cord.

I will describe only one form of lamp supporting and conducting cord extension reel embodying my invention, and will then point out the novel features thereof in claim.

In the accompanying drawing:

Fig. 1 is a view showing in top plan one form of lamp supporting and conducting cord extension reel embodying my invention.

Fig. 2 is a transverse sectional view taken on the line 2—2 of Fig. 1 and showing an electric lamp in place on the reel.

Fig. 3 is a horizontal sectional view taken on the line 3—3 of Fig. 2.

Fig. 4 is a view showing one form of clasp embodying my invention.

Fig. 5 is a fragmentary view showing the reel in side elevation and the clasp applied to a support.

Figs. 2 to 5 are on a scale reduced with respect to Fig. 1.

In carrying out my invention, I provide a reel member formed of rubber or other suitable insulating material, which includes a disk 15 and a hub 16. The disk 15 is of such diameter as to be readily grasped in one hand, and its periphery is widened to form thereon an annular flange 17 which extends to opposite sides of the disk for a purpose to be described hereinafter. The periphery of the disk is preferably knurled as indicated at 18 in Fig. 5, in order to facilitate turning of the disk.

As best shown in Fig. 2, the hub 16 is formed integral with the disk 15 and axially at the inner side thereof. This hub has an internal diameter such as to accommodate a conventional screw-threaded lamp socket 19 secured therein by a screw bolt 20 extending through the side of the socket and hub. This screw bolt 20 constitutes a binding post to which one wire 21 of an insulated conducting cord C is connected through a lead 22, as best illustrated in Fig. 3. The other wire 23 of the conducting cord, is extended through an opening 24 in the hub and connected to a lead 25 which latter in turn is connected to a screw 26 secured in the disk 15 and constituting a central contact for an electric lamp 27 which, as shown in Fig. 2, is threaded in the socket 19 to engage such contact. Thus the two wires 21 and 23 are electrically connected so that current can be supplied to the lamp.

The cord C is of any suitable length and is adapted to be wound on the hub 15 in the manner shown in Fig. 2, the hub being of sufficient length to readily accommodate the cord with its free or open end projecting beyond the cord. As shown in Fig. 3, the inner end of the cord is extended through a screw eye 28 and then knotted as at 29 to fixedly secure the cord to the hub in order that when the hub is rotated, the cord will be wound on or unwound from the hub according as the latter is rotated in one direction or the other. Beyond the knot the cord is stripped of its fabric and insulating covering, but it will be understood that the wires 21 and 23 still retain a thin covering of insulation.

The reel embodying my invention includes, also, a casing or cover K or insulating material made in substantial cup shape with its open side of a diameter slightly less than the inside diameter of the flange 17, in order that it may engage the inner side of the disk 15 within the area defined by the flange. As shown in Fig. 2, the casing K is formed centrally with an opening 30 to receive freely the open end of the hub 16, and the wall of this opening is recessed at its outer side to form an annular shoulder 31 on which a flange 32 of a collar 33, is seated. The collar 33 is provided for the purpose of securing the casing K against displacement from the hub, and yet allow the hub to rotate freely in the casing. To this end the collar is screw-threaded on the hub, and when the collar is screwed home the flange 32 engages the shoulder 31, but not such as to impede rotation of the hub in the casing. Screwing of the collar on the hub can be readily effected by applying a suitable instrument such as a spanner wrench, to openings 34 in the flange 32, and when once screwed home the collar can be secured against unscrewing by the application of a suitable cement to the threads of the collar and hub.

As shown in Figs. 1 and 2, the outer end of the conducting cord C is extended exteriorly of the reel through an opening 35 in the casing K, and the extremity of the cord has attached thereto a conventional form of plug 36.

For the purpose of detachably mounting my reel in fixed position on any suitable support such as the table top T fragmentarily illustrated in Fig. 5, I have provided a clasp P formed from a single length of wire bent to provide at least two convolutions, with the ends of the wire bent laterally and extended through the disk 15. These wire ends are secured within the disk in any suitable manner such as by welding heads 37 thereon as indicated in dash lines in Fig. 4.

In practice, the plug 36 is screwed into a wall or other conventional form of socket, and with the conducting cord completely wound on the hub 16, one can, by gripping the casing so that the reel member is free to rotate, move the reel together with the lamp away from the wall socket. Under such movement the reel member is caused to be rotated to unwind the cord from the hub. In this manner the cord can be extended the desired length to permit positioning of the reel and lamp on any suitable support and secured on such support by spreading the convolutions of the clasp to grip the support in the manner illustrated in Fig. 5.

To rewind the cord on the reel, it is only necessary to remove the plug 36 from the wall socket when the reel member can be manually rotated by holding the casing K in one hand and gripping and turning the disk 15 with the other hand. In this manner the hub is rotated to cause the conducting cord to be wound thereon until the plug 36 is drawn into engagement with the casing.

From the foregoing operation, it will be manifest that the conducting cord being wound on the hub naturally rotates with the hub and also the disk during winding and unwinding movements of the cord. Consequently, there is no relative movement between the conducting cord and the hub and disk during such winding and unwinding movements. As a result, the conducting cord cannot scrape or rub against the surfaces of these elements to wear away the covering fabric and insulation. Further, the conducting cord does not contact with the inner wall of the casing K so that again there is no rubbing or scraping of the cord against the casing. Inasmuch as the conducting cord is not scraped or rubbed by any surface of the reel, it will be manifest that no appreciable wear of the cord can take place as a result of winding and unwinding it upon the reel. The conducting cord, in failing to have any frictional contact with any surface of the reel, reduces the resistance offered to turning movement of the reel, and consequently, the reel can be much easier turned in effecting winding and unwinding movements of the cord.

An important feature of my invention resides in the fact that with the reel secured on a support by the clasp, in the manner illustrated in Fig. 5, the disk 15, and hence the hub 16, are held against rotation so that no accidental unwinding of the conducting cord can occur. It will be noted that that part of the flange 17 which projects to the outer side of the disk coacts with the latter to form a pocket in which the clasp is received when not in use, but when the clasp is in use the inner convolution thereof reposes in the pocket to allow the flange to engage the support and thus permit the reel to lie flat on the support, as illustrated.

Although I have herein shown and described only one form of lamp supporting and cord extension reel embodying my invention, it is to be understood that various changes and modifications may be made herein without departing from the spirit of my invention and the spirit and scope of the appended claim.

I claim:

A reel of the character described, comprising; a disk; a hub fixed at one end to and projecting axially from one side of said disk and to which one end of a conducting cord is adapted to be secured; an electrical socket so secured to said hub as to be accessible from the other end thereof and to which the conducting cord is adapted to be connected; a cupped casing surrounding said hub with its open side confronting said disk, said casing having a central opening so receiving said hub that the casing is rotatable on the hub, and a peripheral opening through which the conducting cord is adapted to extend from the hub exteriorly of the casing; and a collar threaded on the hub and having a lateral flange engaging the outer side of the casing to coact with the disk in confining the casing against displacement from the hub.

JACOB J. CANTOR.